United States Patent [19]
Weigele

[11] Patent Number: 5,969,234
[45] Date of Patent: Oct. 19, 1999

[54] APPARATUS FOR REPAIRING AND/OR LEAKAGE TESTING OF SEWER PIPES

[75] Inventor: Uwe Weigele, Pfullendorf, Germany

[73] Assignee: Umwelttechnik Strobel GmbH, Germany

[21] Appl. No.: 09/019,755

[22] Filed: Feb. 6, 1998

[51] Int. Cl.[6] .............................. G01M 3/02; F16L 55/12; F16L 55/162

[52] U.S. Cl. ........................... 73/40.5 R; 138/97; 138/90; 138/93

[58] Field of Search ........................... 73/40.5 R, 40.5 P; 138/90, 92, 94, 97, 93

[56] References Cited

U.S. PATENT DOCUMENTS

| Re. 33,160 | 2/1990 | Guthrie et al. | 73/40.5 R |
| 3,762,446 | 10/1973 | Tungseth et al. | 138/97 |
| 4,067,349 | 1/1978 | Austin et al. | 138/197 |
| 4,646,787 | 3/1987 | Rush et al. | 138/98 |
| 4,691,728 | 9/1987 | Mathison | 73/40.5 R |

Primary Examiner—Michael Brock
Attorney, Agent, or Firm—Bachman & LaPointe, P.C.

[57] ABSTRACT

An apparatus for repairing and/or leakage testing of sewer pipes, in particular of connecting pipes diverging therefrom. The apparatus is constructed as a tubular member and includes an opening, wherein the apparatus can be moved in the sewer pipe. The apparatus has a bladder which can be moved out through the opening.

23 Claims, 6 Drawing Sheets

APPARATUS FOR REPAIRING AND/OR LEAKAGE TESTING OF SEWER PIPES

The present invention relates to an apparatus for repairing or leakage testing of sewer pipes, in particular of connecting pipes diverging therefrom, having a device which can be moved in the sewer pipe and, if appropriate, is assigned a bladder which can be moved out through an opening.

Such apparatuses are known and customary in greatly multifarious forms and designs in the prior art. They are used to check sewer pipes, in particular branching connecting pipes or sewer connections, and also sewer ramifications, and to eliminate damaged sites. Such damaged sites, in particular connecting points of connecting pipes opening into a sewer pipe are frequently caused by corrosive and eroding constituents of the sewage. Uncontrolled amounts of sewage containing pollutants can seep into the ground and, in particular, into the groundwater through these damaged sites, and this can represent a substantial risk to drinking-water quality. These damaged sites must be eliminated.

Such repair is difficult, in particular, in sewers where people cannon pass. Use is made for this purpose of sewer robots which repair such damaged sites with a filler. The most varied apparatuses are known in this connection in the prior art.

Reference may be made, for example, to EP 0 674 132. There, a device and a method for sealing an opening site into a collecting conduit is known, a robot being used to insert into a sewer connection a shuttering plate with a bladder which can be guided through. The shuttering plate is supported via supporting arms. The disadvantage of this is that the action of supporting can damage the sewer pipe inner wall.

Also known from the prior art according to WO 95/30858 is a repairing apparatus for repairing sewer pipes, in particular connecting pipes, in which a moveable shuttering plate through which a bladder can be guided can be used to seal connections. The disadvantage here is that the shuttering plate is supported during the repairing operation by supporting wheels which can be actuated by cylinder. The effect of this is that when pressure is applied to the shuttering plate against the sewer pipe inner wall the opposite sewer pipe inner wall is damaged by the supporting wheels. High contact pressures cannot be exerted here. It is also disadvantageous that radial sealing is not possible.

It is the object of the present invention to create an apparatus of the above-mentioned type which eliminates said disadvantages and by means of which a precision seal can be produced in a short time in a very simple way.

This object is achieved by virtue of the fact that the device is constructed as a tubular member.

It is possible by means of the present invention for the tubular member of the device for repairing sewer pipes to be moved upward by a rubber-like element which is constructed such that it can be inflated or expanded in a, preferably, lower region. After being inflated, the expandable rubber-like element bears against a sewer pipe inner wall on an underside and is supported there.

The upper region of the tubular member is then, if appropriate, also pressed by means of the coating against the upper sewer pipe inner wall into the region of a domestic pipe connection. Provided in the tubular member is an opening through which a bladder can, if appropriate by means of a reel, be moved out and inflated. At least one outlet is provided in the tubular member, in particular next to the opening, for the purpose of feeding filler, in order to seal a damaged connecting point between the sewer pipe and connecting pipe.

It is, however, important in the case of the present invention that the device is supported over the entire surface of the tubular member, in particular in the lower region. This produces a uniform force distribution and a contact pressure of the upper region against the sewer pipe inner wall which can be determined. In order for the upper region of the sewer pipe to bear directly against the sewer pipe inner wall, it is constructed approximately with the same radius. The lower region of the sewer pipe is constructed with a smaller radius than the upper region. This geometry ensures in the case of a unipartite or multipartite construction of the tubular member that the latter can be moved in the sewer pipe. This can come about in the most varied ways. It is preferred to provide on the supports at the ends supporting wheels which move the device back and forth in the sewer pipe by means of axles and/or swivel the device radially.

The tubular member can be moved upward by the expansion of the elastic element in the lower region. The contact pressure can be controlled without the sewer pipe being damaged in any way at all.

By virtue of the fact that the tubular element is supported rotatably by means of axles, any arbitrary connecting pipe can also be approached radially by the opening and, in particular, by the annular element of the tubular member, After the upper region of the tubular member has been applied, the bladder is moved out through the opening into the connecting pipe and inflated, and the surrounding connecting point has then filler pressed into it via at least one connection and is sealed. So that no burrs are produced, the annular element has an advantageous ring collar which creates a deburred transition between the sewer pipe and domestic connection. After the curing, the bladder is moved back and the interspace between the lower region of the tubular member and the elastic element is emptied until the device can again be conveyed further in the sewer pipe on the supporting wheels.

Further advantages, features and details of the invention emerge from the following description of preferred exemplary embodiments and with the aid of the drawing, in which.

Figure 1:
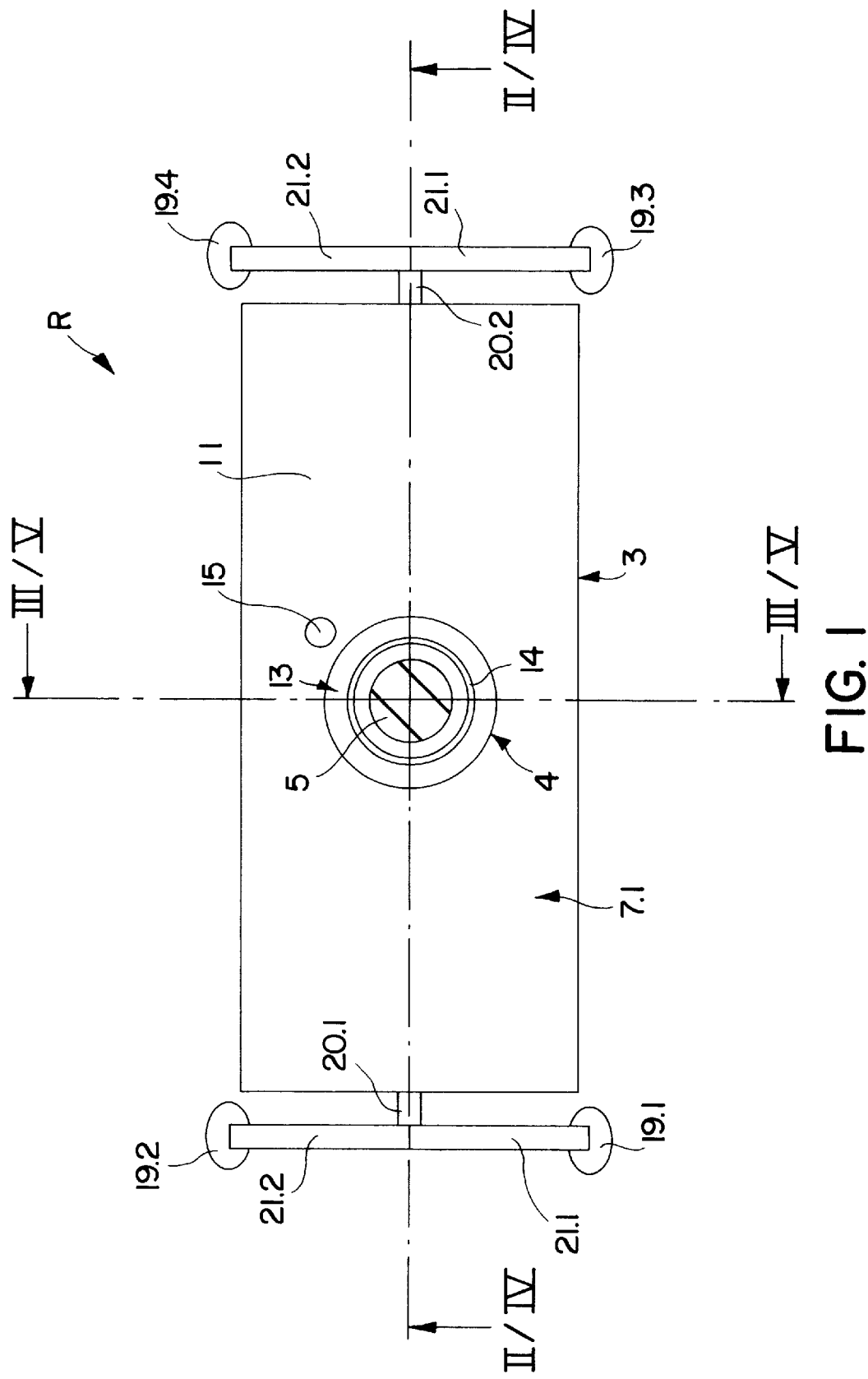
FIG. 1 shows a top view of an apparatus according to the invention for repairing and/or leakage testing of sewer pipes and connecting pipes.

In accordance with FIG. 1, an apparatus R according to the invention for repairing and/or leakage testing of sewer pipes 1 is shown as a device 3. Sewer pipes 1, as also represented in more detail in FIGS. 2 and 4, can have a multiplicity of connecting pipes 2, in particular also domestic connecting pipes, which open into the sewer pipe 1. The device 3 can be moved back and forth in the sewer pipe 1. It is provided with an upper opening 4 through which a bladder 5 can be conveyed out of a tubular member 6 of the device 3 in the most varied ways. As also represented in more detail in FIGS. 2 and 3, the tubular member 6 is preferably formed in a bipartite fashion from an upper region 7.1 and a lower region 7.2. The upper region 7.1 of the tubular member 6 is constructed with a radius r1 corresponding to a radius of a sewer pipe inner wall 8. This emerges, in particular, from FIGS. 3 and 5.

An important feature of the present invention is that the tubular member 6 is either of unipartite or multipartite, but preferably of bipartite, construction. The upper region 7.1 immediately adjoins a lower region 7.2. What is decisive here is that the lower region 7.2 is constructed with a radius r2 smaller than the radius r1 of the upper region 7.1. As a result, the lower region 7.2 has a radius which is smaller than that of the sewer pipe inner wall 8.

Figure 3:
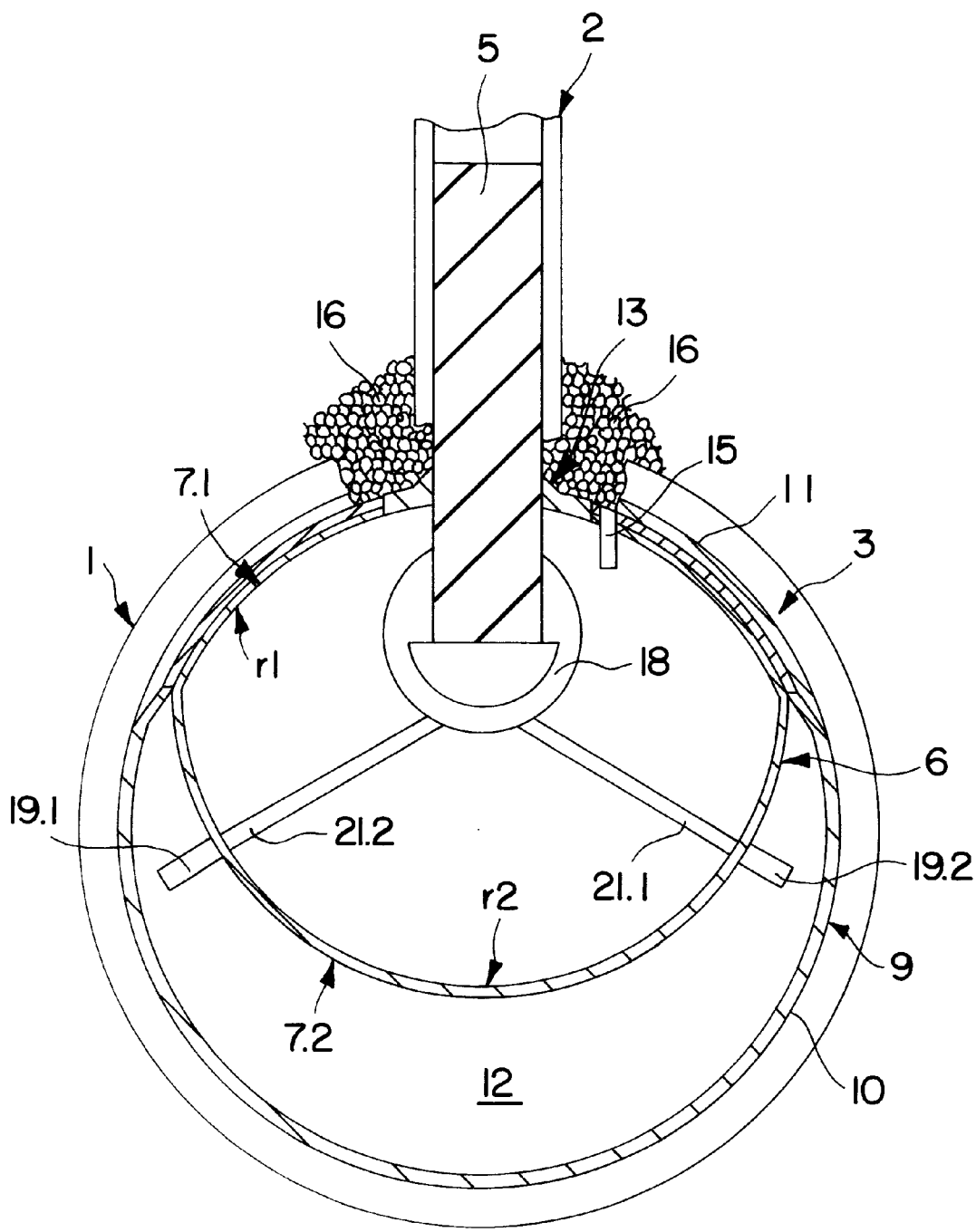
FIG. 3 shows a cross section through the apparatus in accordance with FIG. 1 along the line III—III in a position of use.
Figure 5:
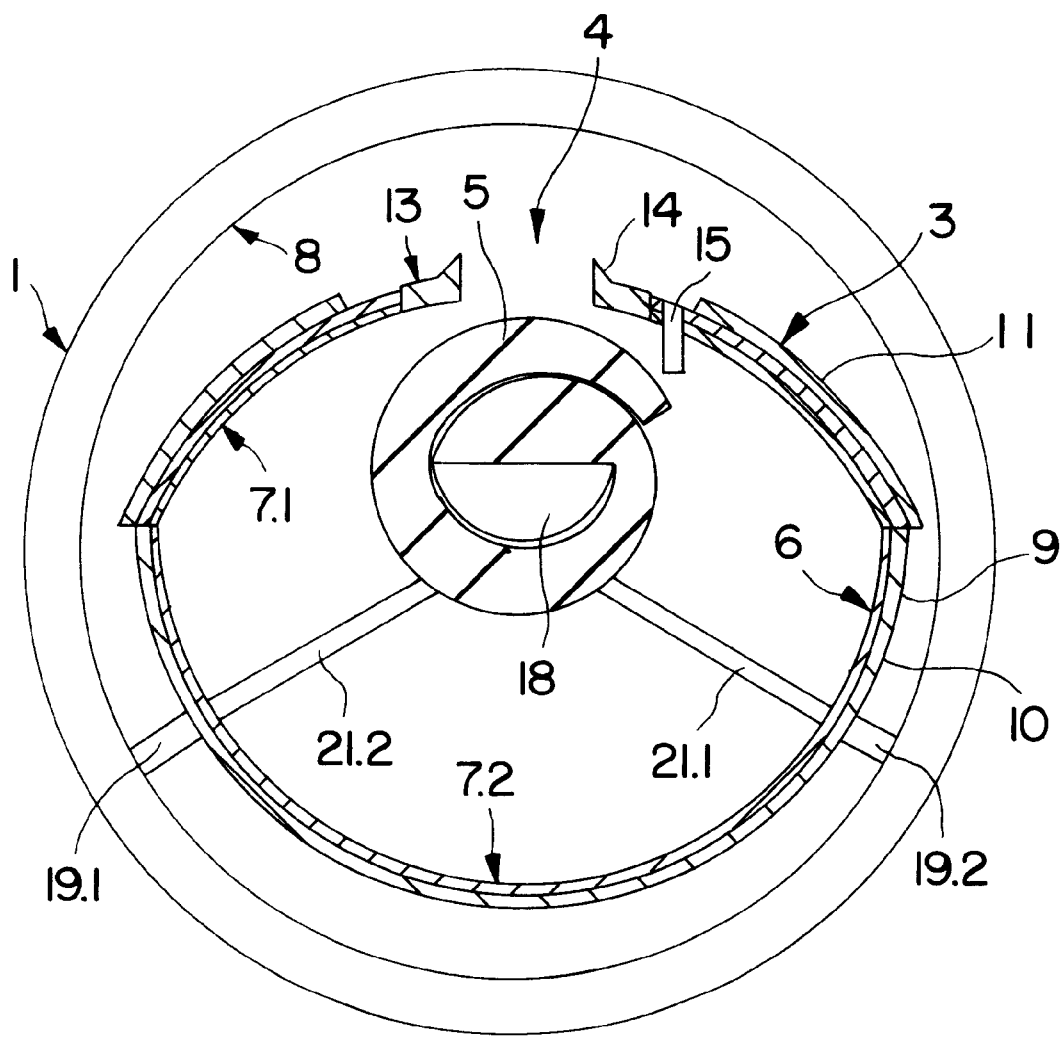
FIG. 5 shows a longitudinal section through the apparatus in accordance with FIGS. 1 and 4 along the line IV—IV in an idle position.

Furthermore, it is important in the case of the present invention, as represented in FIGS. 3 and 5, in particular, that the tubular member 6 is surrounded by a preferably elastic element 9. The opening 4 is excluded from this. The elastic element 9 is firmly connected in the upper region 7.1 of the tubular member 6. However, in the lower region 7.2 the elastic element 9 rests loosely on the tubular member 6. If, by means of connections not represented here, a medium, in particular a liquid or even air, is introduced between the lower region 7.2 and the rubber element 10 into an interspace 12, the device 3 can be moved upward, the upper region 7.1, which is provided with a coating 11 adjoining the elastic element 9, being pressed against the sewer pipe inner wall 8. It is advantageous in pressing if the coating 11 is constructed to be thinner or more elastic in the region of the opening 4 than in the remaining regions, so that the layer thickness can be influenced in the region of the sewer pipe inner wall 8 when pressing.

Depending on the pressure and medium, a contact pressure on the sewer pipe inner wall can be determined exactly.

If the device 3 with its opening 4 is aligned exactly over a connecting pipe, an annular element 13 such as is clearly represented in FIGS. 1 to 5 can project into a connecting pipe 2. The annular element 13 can, if appropriate, be arranged in the tubular member 6 such that it can be exchanged. It can be provided with a ring collar 14 in order to permit centering and edge-free repairing. This will be considered later below.

Figure 2:
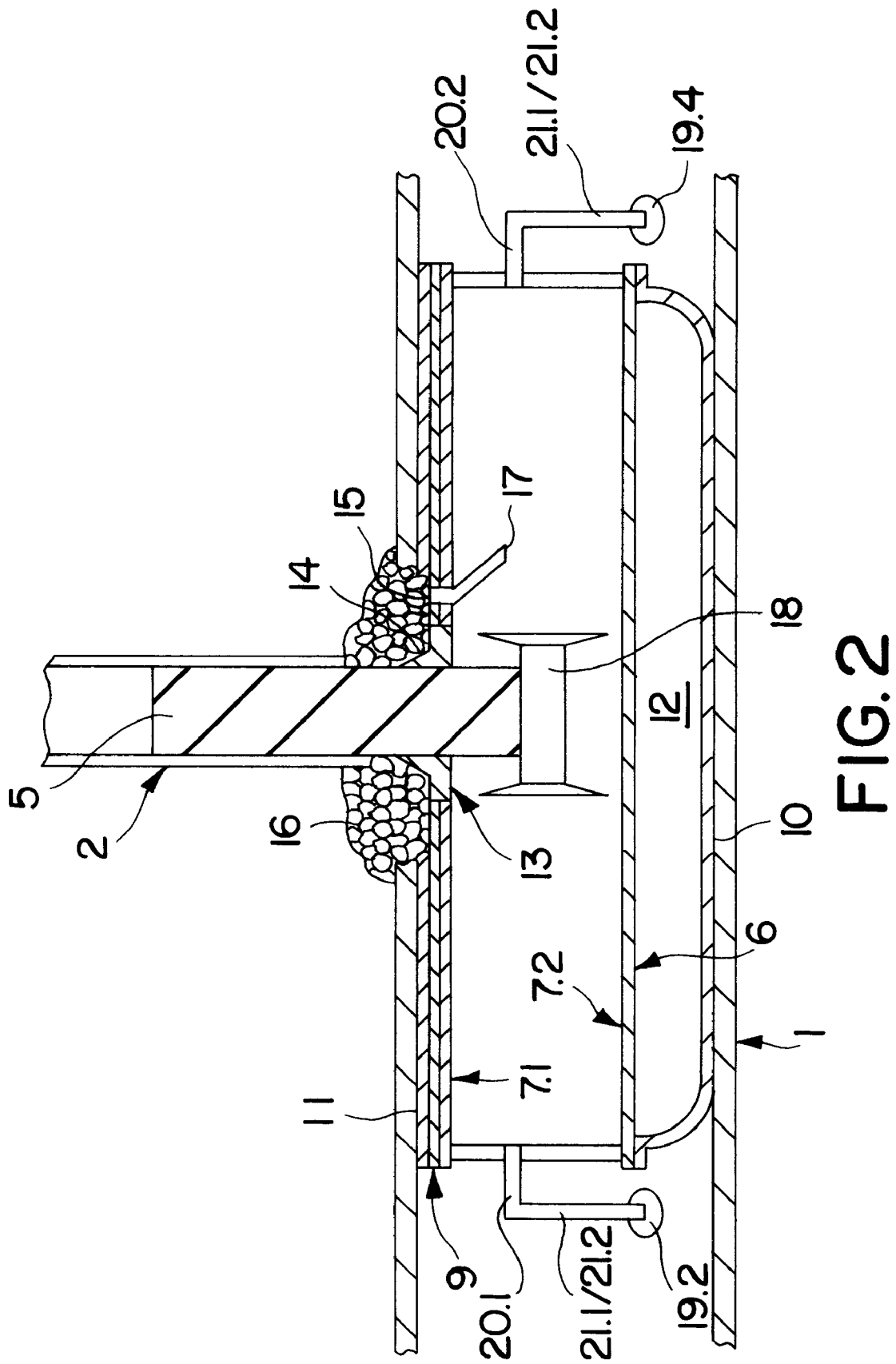
FIG. 2 shows a longitudinal section through the apparatus according to the invention in accordance with FIG. 1 in a possible position of use along the line II—II.

It is preferred to provide an outlet 15 next to the opening 4 and, in particular, next to the annular element 13, as is represented in particular in FIGS. 1 and 2. It is also possible here for a plurality of outlets 15 to be arranged in an individually controllable fashion distributed over the circumference of the tubular member 6. A filler 16 is pressed outward from the outlet 15 via a connecting line 17 which is only indicated here (see FIG. 2). Use may be made in this case of the most varied mortars or plastic materials for repairing a connecting point 22 between the connecting pipe 2 and sewer pipe 1.

The bladder 5 is moved out of the opening 4 by means of a reel 18 so that the filler 16 enters only damaged cracks or the like during the pressing and, in particular, during the repair of connecting pipes. The bladder 5 can likewise be expanded by means of an arbitrary medium. Gas, air or even a liquid are considered here.

In order for the apparatus R to be constructed so that it can move inside the sewer pipe 1 and can move back and forth in the sewer pipe 1 from one connecting pipe 2 to the next, provision is made of supporting wheels 19.1 to 19.4, preferably arranged at the end faces. They are supported by means of the axles 20.1, 20.2 and supports 21.1, 21.2 adjacent thereto. The supports 21.1, 21.2 are preferably positioned at a slight angle to one another. The device 3 is supported so that it can rotate with respect to the supporting wheels 19.1 to 19.4 by means of the axles 20.1, 20.2.

Figure 4:
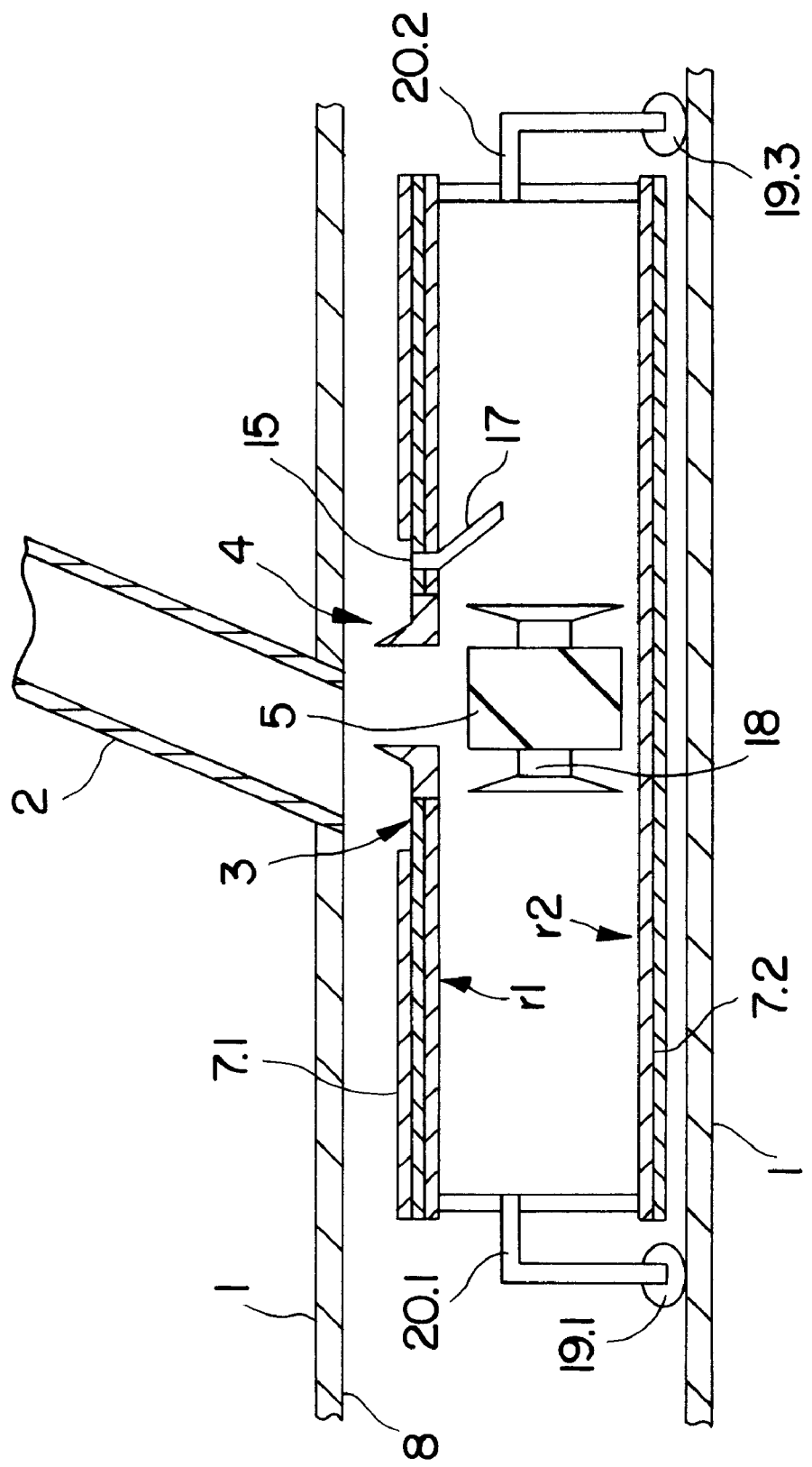
FIG. 4 shows a longitudinal section through the apparatus in accordance with FIG. 1 along the line IV—IV in an idle position.
Figure 6:
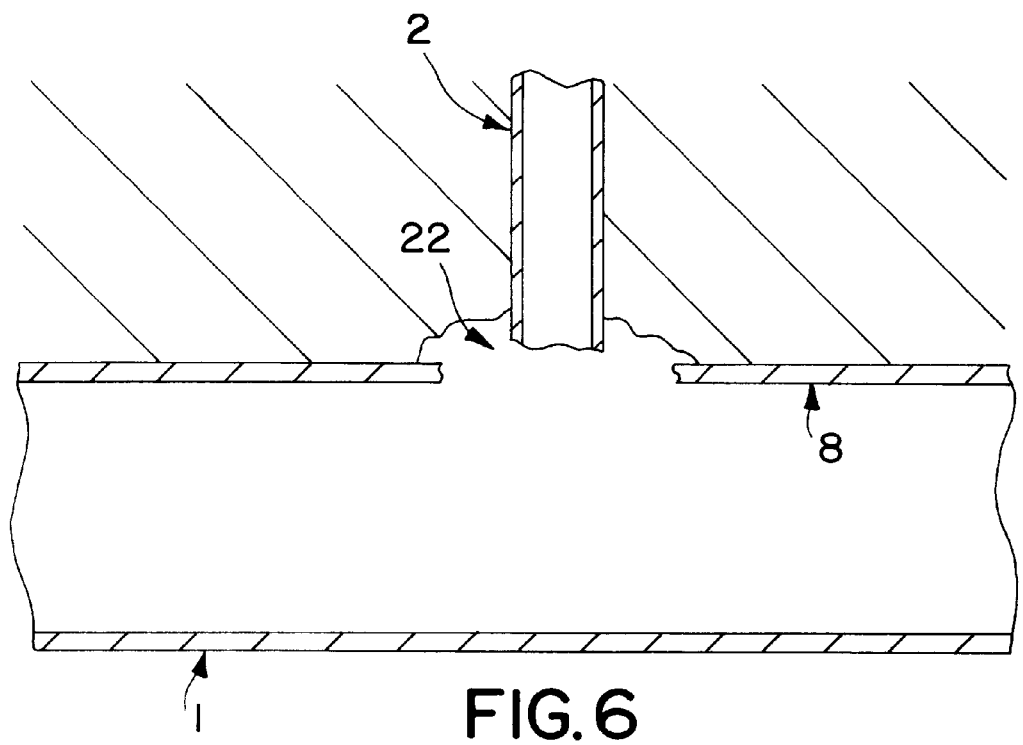
FIG. 6 shows a longitudinal section through a diagrammatically represented damaged connecting point of a connecting pipe on a sewer pipe.

The mode of operation of the present invention is as follows:

A defective connecting point 22 of a connecting pipe 2 adjoining a sewer pipe 1 is shown in FIG. 6. These damaged connecting points 22 are caused essentially by corrosive, but also eroding constituents of the sewage. These connecting points must be repaired so that harmful sewage does not pass into the groundwater. For this purpose, the apparatus R according to the invention is inserted into the sewer pipe 1, for example through a shaft (not represented here), as represented in FIG. 4.

The apparatus R can be moved back and forth controllably in the sewer pipe 1 by means of the, possibly driven, supporting wheels 19.1 to 19.4. Cameras (not represented here) or sensors can be used, on the one hand, to determine the connecting pipes 2 in the sewer pipe 1, and to check their condition. If appropriate, these are cleaned before being appraised by a camera. Subsequently, The device 3 with its opening 4 is moved in front of a damaged connecting pipe 2. The tubular member 6 is aligned radially in front of a connecting pipe 2, possibly also opening at the side, by rotating the tubular member 6 about the axles 20.1, 20.2, the supporting wheels 19.1 to 19.4 not being moved.

In this idle position, the bladder 5 is wound up on the reel is in the interior of the tubular member 6. This may be seen in FIGS. 4 and 5.

After the opening 4 has been aligned with a connecting point 22, an interspace 12, as represented, in particular, in FIGS. 2 and 3, is filled with a medium, in particular air. As a result, the elastic element 9 is expanded in the region 7.2 and fills up the interspace 12. The elastic element 9 bears inside against the sewer pipe inner wall 8 and moves the device 3, in particular the tubular member 6 upward and presses the region 7.1 of the tubular member 6, in particular its coating 11, against the sewer pipe inner wall 8, as is represented in FIGS. 2 and 3. Subsequently, the bladder 5 is moved out, through the opening 4 and, in particular, through the annular element 13, into the connecting pipe 2 and inflated there. Said bladder bears against the inner wall of said pipe and forms a seal.

Figure 7:
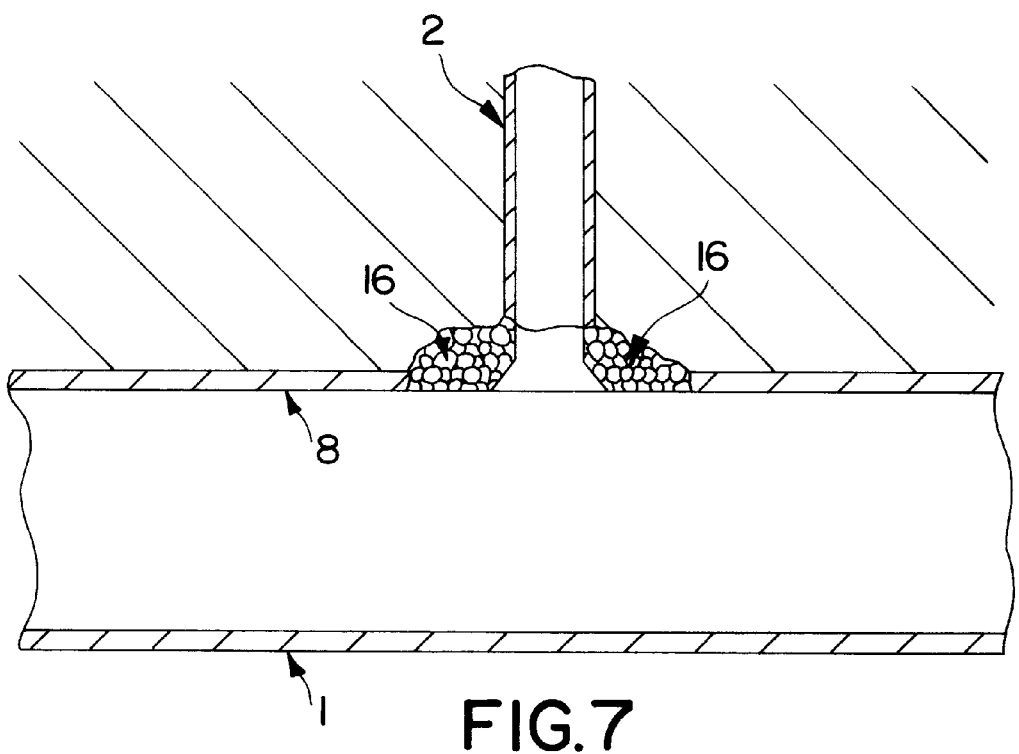
FIG. 7 shows a longitudinal section through a diagrammatically represented repaired connecting point of a connecting pipe on a sewer pipe.

Filler 16 is pressed into the region of the connecting point 22 via the outlet 15, so that damaged points can be filled with filler 16, as is represented in FIGS. 6 and 7. The ring collar 14 of the annular element 13 can be constructed in a cambered and collar-like fashion so that no undesired edges and burrs are produced between the connecting pipe 2 and the sewer pipe 1.

After the pressing of filler 16 against the connecting point 22 and a subsequent curing operation, the bladder 5 is inserted into the tubular member 6 by means of the reel 18, and the medium is let out of the interspace 12, with the result that the tubular member 6 sinks downward and can be conveyed further in the sewer pipe 1 by means of its supporting wheels 19.1 to 19.4.

The present invention provides an apparatus for repairing connecting pipes 2, in the case of which a contact pressure can be determined with extreme exactitude and by means of which precise damaged sites can be eliminated.

I claim:

1. An apparatus for repairing and/or leakage testing of sewer pipes and of connecting pipes diverging therefrom, which comprises a device constructed as a tubular member and having an opening therein, wherein said device can be moved in the sewer pipe, said device including a bladder which can be moved out through said opening.

2. The apparatus of claim 1, wherein the tubular member is of unipartite construction.

3. The apparatus of claim 1, wherein the tubular member is of multipartite construction.

4. The apparatus of claim 3, wherein the tubular member is of bipartite construction.

5. The apparatus of claim 1, wherein at least one region of the tubular member is of cambered construction.

6. The apparatus of claim 5, wherein said at least one region of the tubular member corresponds approximately to an inside radius (r1) of an inner wall of a sewer pipe.

7. The apparatus of claim 6, including another region of said tubular element opposed to said at least one region and including an expandable element therein operative to lift the device against said sewer pipe.

8. The apparatus of claim 7, wherein the expandable element adjoins an elastic coating which rests at least partially on said at least one region of the tubular member.

9. The apparatus of claim 8, wherein the elastic coating rests on the expandable element at least partially in said another region.

10. The apparatus of claim 8, wherein at least one outlet is provided near said opening for distributing filler, wherein said outlet penetrates the tubular member and the expandable element.

11. The apparatus of claim 10, wherein the outlet is connected to a line for feeding the filler.

12. The apparatus of claim 8, wherein said coating is constructed to be at least one of thinner and more elastic in the region of the opening than in remaining regions.

13. The apparatus of claim 7, wherein the expandable element can be expanded by means of pressure via an arbitrary medium by virtue of the fact that it is possible to fill an inner space between said another region of the tubular member and the expandable element.

14. The apparatus of claim 7, wherein a radius (r2) of said another region is constructed to be smaller than said radius (r1) of said at least one region.

15. The apparatus of claim 7, wherein the expandable element completely surrounds the tubular member, is connected firmly to the tubular member in said at least one region, and bears expandably against the tubular member in said another region.

16. The apparatus of claim 1, wherein an annular element is inserted into said opening.

17. The apparatus of claim 16, wherein the annular element has a ring collar which is constructed outwards in a cambered fashion.

18. The apparatus of claim 17, wherein the annular element is inserted into the tubular member such that it can be exchanged with annular collars of different construction.

19. The apparatus of claim 1, wherein said bladder can be moved out of said opening under pressure.

20. The apparatus of claim 19, wherein said bladder can be moved out of said opening by means of a reel arranged radially or axially in the tubular member.

21. The apparatus of claim 1, including a plurality of supporting walls which are constructed in a driveable fashion and which adjoin the tubular member.

22. The apparatus of claim 21, wherein the supporting walls are connected to the tubular member laterally via axles, the tubular member being constructed such that it can rotate axially about the axles with respect to the supporting wheels.

23. The apparatus of claim 22, wherein supports adjoin said axles and are spaced apart from one another angularly and on which the supporting wheels are provided.

* * * * *